US010708339B2

(12) United States Patent
Wang et al.

(10) Patent No.: US 10,708,339 B2
(45) Date of Patent: Jul. 7, 2020

(54) METHOD FOR REALIZING DATA SHARING BETWEEN CLIENT AND VIRTUAL DESKTOP, CLIENT AND SYSTEM

(71) Applicant: ZTE CORPORATION, Guangdong (CN)

(72) Inventors: Changzheng Wang, Guangdong (CN); Wenfei Xiu, Guangdong (CN); Peiwen Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 86 days.

(21) Appl. No.: 15/737,003

(22) PCT Filed: Apr. 28, 2016

(86) PCT No.: PCT/CN2016/080543
§ 371 (c)(1),
(2) Date: Dec. 15, 2017

(87) PCT Pub. No.: WO2016/202105
PCT Pub. Date: Dec. 22, 2016

(65) Prior Publication Data
US 2018/0375921 A1 Dec. 27, 2018

(30) Foreign Application Priority Data
Jun. 19, 2015 (CN) .......................... 2015 1 0346382

(51) Int. Cl.
H04L 29/08 (2006.01)
H04L 29/06 (2006.01)
G06F 9/455 (2018.01)

(52) U.S. Cl.
CPC .......... H04L 67/06 (2013.01); G06F 9/45558 (2013.01); H04L 29/08 (2013.01);
(Continued)

(58) Field of Classification Search
None
See application file for complete search history.

(56) References Cited

U.S. PATENT DOCUMENTS 8,135,818 B2    3/2012  Heim
8,296,352 B2 * 10/2012  Mazzaferri ............. G06F 9/542
                                                    709/202

(Continued)

FOREIGN PATENT DOCUMENTS

CN    102447723 A    5/2012
CN    102571773 A    7/2012

(Continued)

OTHER PUBLICATIONS

European Extended Supplementary Search Report dated Apr. 3, 2018 received in European Patent Application No. 1681 0846.2.

(Continued)

Primary Examiner — Thomas J Dailey
(74) Attorney, Agent, or Firm — Scully Scott Murphy & Presser

(57) ABSTRACT

Disclosed are a method for realizing data sharing between a client and a virtual desktop, a client and a system. The method includes: after completing an operation of logging in a virtual desktop by a user, starting, by an SPICE client, a proxy client according to a user instruction of data sharing migration; establishing, by the proxy client, a connection with a proxy server in the virtual desktop, interacting with the proxy server through the connection to complete the configuration of an FTP server in the virtual desktop, and then starting an FTP client; and establishing, by the FTP client, a data sharing channel with the FTP server, and completing an operation of data sharing migration. Also provided are a corresponding virtual desktop client and virtual desktop system.

20 Claims, 4 Drawing Sheets

(52) U.S. Cl.
CPC ............ *H04L 67/08* (2013.01); *H04L 67/141* (2013.01); *H04L 67/28* (2013.01); *H04L 67/2804* (2013.01); *H04L 67/34* (2013.01); *H04L 67/38* (2013.01); *G06F 2009/4557* (2013.01); *G06F 2009/45595* (2013.01)

(56) References Cited

U.S. PATENT DOCUMENTS

| | | | | |
|---|---|---|---|---|
| 9,489,227 | B2* | 11/2016 | Oh | G06F 9/45533 |
| 2010/0325278 | A1* | 12/2010 | Heim | G06F 9/4416 |
| | | | | 709/226 |
| 2011/0004680 | A1* | 1/2011 | Ryman | H04L 67/025 |
| | | | | 709/224 |
| 2011/0099497 | A1* | 4/2011 | Fok | G06F 3/0486 |
| | | | | 715/769 |
| 2012/0226742 | A1* | 9/2012 | Momchilov | G06F 3/1454 |
| | | | | 709/203 |
| 2012/0324365 | A1* | 12/2012 | Momchilov | G06F 3/14 |
| | | | | 715/738 |
| 2014/0188977 | A1 | 7/2014 | Song et al. | |

FOREIGN PATENT DOCUMENTS

| | | | |
|---|---|---|---|
| CN | 102638475 | A | 8/2012 |
| CN | 103475726 | A | 12/2013 |
| CN | 104144172 | A | 11/2014 |
| CN | 102638475 | B | 12/2014 |
| CN | 102447723 | B | 9/2015 |
| EP | 2 131 271 | A1 | 12/2009 |
| JP | 2011-524554 | A | 9/2011 |
| RU | 2 368 945 | C2 | 11/2005 |
| RU | 2 523 216 | C2 | 7/2013 |

OTHER PUBLICATIONS

International Search Report dated Jul. 15, 2016 issued in PCT/CN2016/080543.
Nakada H. et al., "A GridRPC Implementation With Overlay Scheduler Jojo3", IPSJ SIG Technical Report 2008 (74):91-96 (Aug. 6, 2008), together with an English-language abstract.
First Office Action dated Aug. 5, 2019 received in Chinese Patent Application No. 201510346382.8, together with English translation.
Application Research on Telecommuncation Network Cloud Computing and Virtual Desktop, with English language abstract.

* cited by examiner

METHOD FOR REALIZING DATA SHARING BETWEEN CLIENT AND VIRTUAL DESKTOP, CLIENT AND SYSTEM

CROSS-REFERENCE TO RELATED APPLICATION

This application is the 371 application of PCT Application No. PCT/CN2016/080543, filed Apr. 28, 2016, which is based upon and claims priority to Chinese Patent Application No. 201510346382.8, filed Jun. 19, 2015, the entire contents of which are incorporated herein by reference.

TECHNICAL FIELD

The present disclosure relates to, but is not limited to, a virtualization technology, and more particularly, relates to a method for realizing data sharing between a client and a virtual desktop, a client and a system.

BACKGROUND

Cloud computing has been listed as one of the key-supported strategic emerging industries by China's "12$^{th}$ Five-Year" Plan. A virtual desktop, as one of the earliest launched projects in the cloud computing industry, has a very huge application scale, and its market demand is in a state of blowout. Governments, colleges and universities, enterprises, and the like have gradually adopted the desktop virtualization technology to replace a traditional PC.

At present, a virtual desktop infrastructure (VDI: Virtual Desktop Infrastructure) is mainly adopted in the desktop virtualization, which can realize remote dynamic access of a desktop system and unified trusteeship of a data center. Users can access personal desktop systems on the network via any device at any time and any place. Obviously, VDI is a revolution of IT infrastructure of an enterprise, which brings mobile computing experience and meets the needs of many specific industries.

A simple protocol for independent computing environment (SPICE: Simple Protocol for Independent Computing Environment) is an open source virtualization push protocol, which is a transport protocol designed specifically for desktop virtualization solutions, and can provide exactly the same user experience as a physical desktop. SPICE enables remote deployment of virtual desktops on servers and remote computers, similar to other rendering remote protocols used for remote desktop management, such as Microsoft's RDP protocol and Citrix's ICA protocol. It supports virtual machine instances such as XP, Win7, and Red Hat Enterprise Linux. The SPICE protocol consists of three components: a SPICE drive (including SPICE Vdagent), a SPICE device, and a SPICE client (SPICE Client). The three components run cooperatively to maximally improve user experience and reduce system loads.

For the virtual desktops, one of the most commonly used functions of the users in daily use is data sharing, i.e., data exchange and transmission between a virtual desktop client (also referred to as a client in short) and a virtual desktop. For example, when the users use the virtual desktop, the local data needs to be shared inside the virtual desktop or a directory file in the virtual desktop needs to be downloaded to the client for use. It can be said that the operability and usability of data sharing determine the promotion extent of the virtual desktops. There may be a plurality of solutions for data sharing requirements of the users, such as instant messager transmission, file sharing, YunFile transfer, file transfer protocol (FTP: File Transfer Protocol) server independently built by customers, or the like, but these methods need to be independently installed or deployed by the users, and have poor experience on usability and operability, require high IT skills of the users, and cannot be promoted to virtual desktop products.

This section provides background information related to the present disclosure which is not necessarily prior art.

SUMMARY

The following is a summary of the subject described in detail herein. This summary is not intended to limit the protection scope of the claims.

The embodiments of the present disclosure provide a method for realizing data sharing between a client and a virtual desktop, a client and a system, which are simple and easy to use.

A method for realizing data sharing between a client and a virtual desktop is applied to a virtual desktop client including an SPICE (simple protocol for independent computing environment) client, a proxy client and an FTP (file transfer protocol) client, wherein the method includes:

after completing an operation of logging in the virtual desktop by a user via the SPICE client, starting, by the SPICE client, the proxy client according to a user instruction of data sharing migration;

after the proxy client is started, establishing, by the proxy client, a connection with a proxy server in the virtual desktop, the proxy client interacting with the proxy server through the connection to complete configuring a FTP server in the virtual desktop, and then starting the FTP client; and after the FTP client is started, establishing, by the FTP client, a data sharing channel with the FTP server to complete an operation of data sharing migration.

Optionally, the starting, by the SPICE client, the proxy client includes: transferring an identity of the virtual desktop to the proxy client; and the establishing, by the proxy client, the connection with the proxy server in the virtual desktop includes: initiating a query for a network protocol IP address to a virtualization management control center by using the identity of the virtual desktop as a keyword, and establishing the connection with the proxy server in the virtual desktop according to the queried IP address.

Optionally, after completing the operation of logging in the virtual desktop by the user via the SPICE client, the method further includes:

initiating a query for a network protocol IP address of the virtual desktop to an SPICE driver by using an identity of the virtual desktop as a keyword and receiving the queried IP address, by the SPICE client; and when starting the proxy client by the SPICE client, further transferring, by the SPICE client, the IP address to the proxy client, wherein the establishing, by the proxy client, the connection with the proxy server in the virtual desktop includes: establishing, by the proxy client, the connection with the proxy server in the virtual desktop according to the IP address.

Optionally, after completing the operation of logging in the virtual desktop by the user via the SPICE client, the method further includes:

establishing a channel with an SPICE driver in the virtual desktop and sending user login information used when the user logs in the virtual desktop to the SPICE driver through the channel, by the SPICE client.

Optionally, after the proxy client establishes the connection with the proxy server in the virtual desktop, the method further includes:

sending, by the proxy client, user login information used when the user logs in the FTP server through the connection, wherein the user login information used when the user logs in the FTP server is the same as or different from user login information used when the user logs in the virtual desktop.

Optionally, the establishing, by the FTP client, the data sharing channel with the FTP server includes:

splicing FTP start-up parameters and establishing the data sharing channel with the FTP server according to the FTP start-up parameters, by the FTP client, wherein the FTP start-up parameters include an IP address of the virtual desktop, and a username and a password in user login information used when the user logs in the FTP server.

Optionally, the interacting, by the proxy client, with the proxy server through the connection includes:

determining a configuration parameter of the FTP server to be used according to a user instruction or a default setting and sending the configuration parameter to the proxy server, by the proxy client; or querying a configuration parameter of the FTP server specified by the user from the virtualization management control center by using user login information used when the user logs in the virtual desktop as a keyword and sending the queried configuration parameter of the FTP server to the proxy server, by the proxy client.

A method for realizing data sharing between a client and a virtual desktop is applied to a virtual desktop system including an SPICE (simple protocol for independent computing environment) driver, a proxy client and an FTP (file transfer protocol) client, wherein the method includes:

establishing, by the SPICE driver, a channel with an SPICE client in a virtual desktop client during a process that a user logs in the virtual desktop;

establishing, by the proxy server, a connection with a proxy client in the virtual desktop client, interacting with the proxy client through the connection to complete configuring the FTP server, and then starting the FTP server; and after the FTP server is started, establishing, by the FTP server, a data sharing channel with the FTP client to complete an operation of data sharing migration.

Optionally, after the SPICE driver establishes the channel with the SPICE client in the virtual desktop client, the method further includes: receiving, by the SPICE driver, user login information used when the user logs in the virtual desktop sent by the SPICE client, and transmitting the user login information to the proxy server.

Optionally, after the proxy server establishes the connection with the proxy client in the virtual desktop client, the method further includes:

receiving user login information used when the user logs in the virtual desktop sent by the proxy client and comparing the user login information with the user login information previously received by the SPICE driver, by the proxy server;

if the two user login information are the same, determining that an authentication on the user is passed, and continuously configuring the FTP server; and if the two user login information are different, determining that the authentication on the user is failed, ending the operation of data sharing migration, and notifying the proxy client.

Optionally, the interacting, by the proxy server, with the proxy client through the connection to complete configuring the FTP server includes:

receiving a configuration parameter of the FTP server sent by the proxy client and proofreading (checking) the configuration parameter, by the proxy server;

if the proofreading is passed, using the received configuration parameter of the FTP server to configure the FTP server and notifying a configuration result to the proxy client; and if the proofreading is not passed, notifying the proxy client that the configuration is failed, or using a default configuration parameter of the FTP server to configure the FTP server and notifying a configuration result to the proxy client.

Optionally, the configuring, by the proxy server, the FTP server further includes:

configuring, by the proxy server, the FTP server by using user login information used when the user logs in the virtual desktop as user login information used when the user logs in the FTP server.

Optionally, the interacting, by the proxy server, with the proxy client through the connection to complete configuring the FTP server further includes:

receiving user login information used when the user logs in the FTP server sent by the proxy client and configuring the FTP server according to the user login information used when the user logs in the FTP server, by the proxy server, wherein the user login information used when the user logs in the FTP server is the same as or different from user login information used when the user logs in the virtual desktop.

A virtual desktop client includes an SPICE (simple protocol for independent computing environment) client, and further includes a proxy client and an FTP (file transfer protocol) client, wherein:

the SPICE client is configured to, after completing an operation of logging in a virtual desktop by a user, start the proxy client according to a user instruction of data sharing migration;

the proxy client is configured to, after being started, establish a connection with a proxy server in the virtual desktop, interact with the proxy server through the connection to complete configuring a FTP server in the virtual desktop, and then start the FTP client; and the FTP client is configured to, after being started, establish a data sharing channel with the FTP server to complete an operation of data sharing migration.

Optionally, the SPICE client is configured to start the proxy client through a manner of transferring an identity of the virtual desktop to the proxy client; and the proxy client is configured to establish the connection with the proxy server in the virtual desktop through a manner of initiating a query for an IP address of the virtual desktop to a virtualization management control center by using the identity of the virtual desktop as a keyword, and establishing the connection with the proxy server in the virtual desktop according to the queried IP address.

Optionally, the SPICE client is further configured to, after completing the operation of logging in the virtual desktop by the user, initiate a query for an IP address of the virtual desktop to an SPICE driver by using an identity of the virtual desktop as a keyword, and receive the queried IP address; and the SPICE client is further configured to, when starting the proxy client, transfer the IP address to the proxy client, wherein the proxy client is configured to establish the connection with the proxy server in the virtual desktop through a manner of establishing, by the proxy client, the connection with the proxy server in the virtual desktop according to the IP address.

Optionally, the SPICE client is also configured to, after completing the operation of logging in the virtual desktop by the user, establish a channel with an SPICE driver in the virtual desktop, and send user login information used when the user logs in the virtual desktop to the SPICE driver through the channel.

Optionally, the proxy client is further configured to, after establishing the connection with the proxy server in the virtual desktop, send user login information used when the user logs in the FTP server to the proxy server through the connection, wherein the user login information used when the user logs in the FTP server is the same as or different from user login information used when the user logs in the virtual desktop.

Optionally, the FTP client is configured to establish the data sharing channel with the FTP server through a following manner: splicing FTP start-up parameters and establishing the data sharing channel with the FTP server according to the FTP start-up parameters, by the FTP client, wherein the FTP start-up parameters include an IP address of the virtual desktop, and a username and a password in user login information used when the user logs in the FTP server.

Optionally, the proxy client is configured to establish the connection with the proxy server through a following manner:

determining a configuration parameter of the FTP server to be used according to a user instruction or a default setting and sending the configuration parameter to the proxy server, by the proxy client; or querying a configuration parameter of the FTP server specified by the user from the virtualization management control center by using user login information used when the user logs in the virtual desktop as a keyword and sending the queried configuration parameter of the FTP server to the proxy server, by the proxy client.

A virtual desktop system includes an SPICE (simple protocol for independent computing environment) driver, and further includes a proxy server and an FTP (file transfer protocol) server, wherein:

the SPICE driver is configured to establish a channel with an SPICE client in a virtual desktop client during a process that a user logs in a virtual desktop;

the proxy server is configured to, establish a connection with a proxy client in the virtual desktop client, interact with the proxy client through the connection to complete configuring the FTP server, and then start the FTP server; and the FTP server is configured to, after being started, establish a data sharing channel with the FTP client to complete an operation of data sharing migration.

Optionally, the SPICE driver is further configured to, after establishing the channel with the SPICE client in the virtual desktop client, receive user login information used when the user logs in the virtual desktop sent by the SPICE client, and transmit the user login information to the proxy server.

Optionally, the proxy server is further configured to, after establishing the connection with the proxy client in the virtual desktop client, receive user login information used when the user logs in the virtual desktop sent by the proxy client, and compare the user login information with the user login information previously received by the SPICE driver;

if the two user login information are the same, determine that an authentication on the user is passed, and continuously configure the FTP server; and if the two user login information are different, determine that the authentication on the user is failed, end the operation of data sharing migration, and notify the proxy client.

Optionally, the proxy server is configured to interact with the proxy client through the connection to complete configuring the FTP server through a following manner:

receiving, by the proxy server, a configuration parameter of the FTP server sent by the proxy client and proofreading the configuration parameter;

if the proofreading is passed, using the received configuration parameter of the FTP server to configure the FTP server and notifying a configuration result to the proxy client; and if the proofreading is not passed, notifying the proxy client that the configuration is failed, or using a default configuration parameter of the FTP server to configure the FTP server and notifying a configuration result to the proxy client.

Optionally, the proxy server is further configured to configure the FTP server through a following manner: configuring, by the proxy server, the FTP server by using user login information used when the user logs in the virtual desktop as user login information used when the user logs in the FTP server.

Optionally, the proxy server is further configured to interact with the proxy client through the connection to complete configuring the FTP server through a following manner: receiving, by the proxy server, user login information used when the user logs in the FTP server sent by the proxy client, and configuring the FTP server according to the user login information used when the user logs in the FTP server, wherein the user login information used when the user logs in the FTP server is the same as or different from user login information used when the user logs in the virtual desktop.

A calculating device includes a memory and a CPU, wherein:

the memory is configured to store virtual desktop client software, and the virtual desktop client software includes proxy client software, FTP client software and SPICE client software;

the CPU is configured to execute the software in the memory and complete a corresponding processing, including:

executing the SPICE client software to start the proxy client software according to a user instruction of data sharing migration after completing an operation of logging in a virtual desktop by a user;

executing the proxy client software to establish a connection with the proxy server in the virtual desktop, interact with the proxy server through the connection to complete configuring the FTP server in the virtual desktop, and then start the FTP client software; and executing the FTP client software to establish a data sharing channel with the FTP server to complete an operation of data sharing migration.

A calculating device includes a memory and a CPU, wherein:

the memory is configured to save virtual desktop system software, the virtual desktop system software includes proxy server software, FTP server software and SPICE driver software;

the CPU is configured to execute the software in the memory and complete a corresponding processing, including:

executing the SPICE driver software to establish a channel with an SPICE client in a virtual desktop client in a process that a user logs in the virtual desktop;

executing the proxy server software to establish a connection with the proxy client in the virtual desktop client, interact with the proxy client through the connection to complete configuring the FTP server, and then start the FTP server software; and executing the FTP server software to establish a data sharing channel with the FTP client to complete an operation of data sharing migration.

Based on a VDI infrastructure and an SPICE transport protocol, the foregoing solutions realize data sharing between the client and the virtual desktop, are simple and easy to use, and can also guarantee the security of user data through authentication.

Other aspects can be understood after reading and appreciating the drawings and detailed descriptions.

This section provides a summary of various implementations or examples of the technology described in the disclosure, and is not a comprehensive disclosure of the full scope or all features of the disclosed technology.

DETAILED DESCRIPTION

The embodiments of the present disclosure will be described in detail hereinafter with reference to the drawings. It should be noted that, in case of no conflict, the embodiments in the present application and the features in the embodiments may be arbitrarily combined with each other.

First Embodiment

Figure 1:
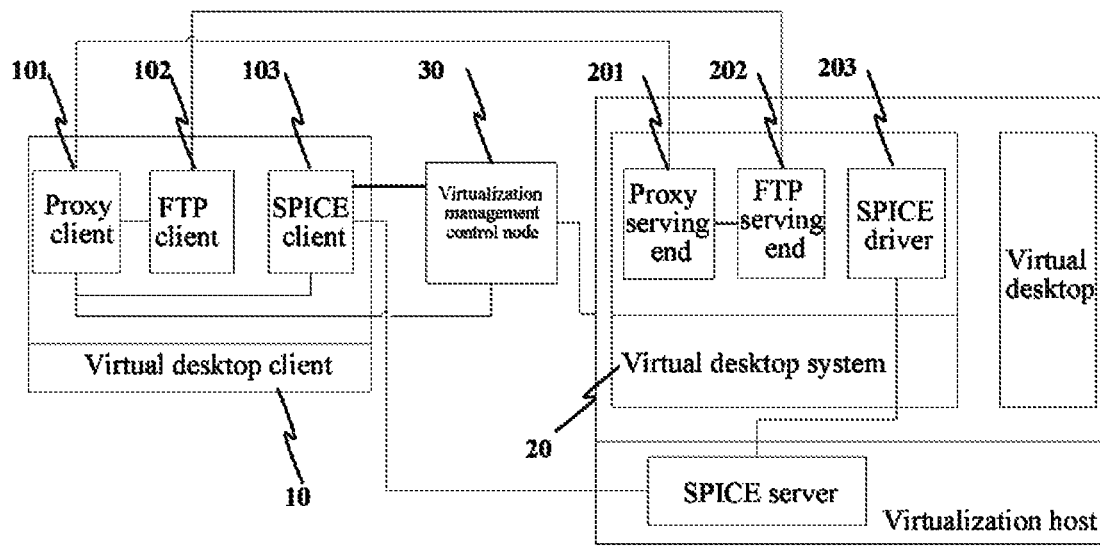
FIG. 1 is a module and connection diagram of a virtual desktop client and a virtual desktop system in a first embodiment and a second embodiment of the present disclosure.

This embodiment provides a method for realizing data sharing between a client and a virtual desktop, which is applied to a virtual desktop client 10 including a proxy client 101, an FTP client 102 and an SPICE client 103, as shown in FIG. 1. FIG. 1 also illustrates a virtual desktop system 20 that can be connected by the virtual desktop client 10 through an SPICE server, and an accessible virtualization management control center 30. According to this embodiment, the proxy client 101 and the FTP client 102 are additionally disposed at the side of the virtual desktop client 10, and the SPICE client 103 is modified. A user does not need to additionally install and deploy the two modules including the proxy client 101 and the FTP client 102. The proxy client 101 is configured to interact service messages with the proxy server running in the virtual desktop; the FTP client 102 is configured to conduct a two-way data transmission with the FTP server running in the virtual desktop; and the modified SPICE client 103 is configured to control message transmission.

The proxy client 101 and the FTP client 102 are modules newly added in the virtual desktop client 10.

Figure 2:
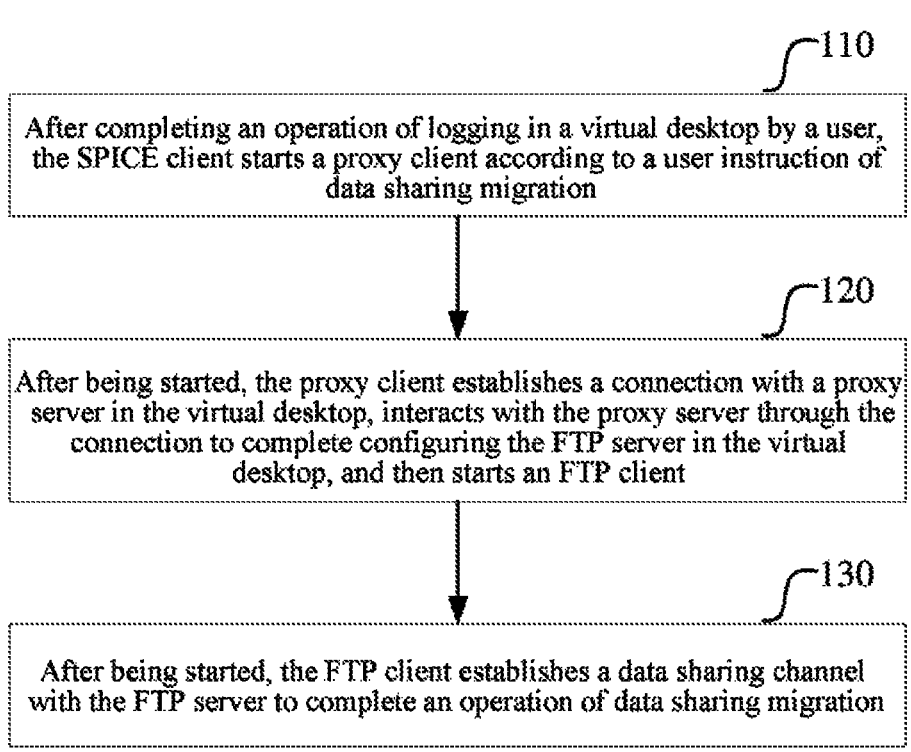
FIG. 2 is a flow chart of a method for data sharing applied to a virtual desktop client side according to the first embodiment of the present disclosure.

As shown in FIG. 2, the method according to this embodiment includes the following steps.

In step 110, the SPICE client, after completing an operation of logging in the virtual desktop by a user, starts the proxy client according to a user instruction of data sharing migration.

In this step, after the SPICE client completes the operation of logging in the virtual desktop by the user, the method may further include: establishing, by the SPICE client, a channel with an SPICE driver in the virtual desktop, and sending user login information used when the user logs in the virtual desktop to the SPICE driver through the channel. The user login information may be used for authentication. If the user login information is also used as user login information used when the user logs in an FTP server, the user login information may also be used for configuring the FTP server.

In this step, the starting, by the SPICE client, the proxy client may include: transferring an identity of the virtual desktop to the proxy client.

In step 120, the proxy client, after being started, establishes a connection with a proxy server in the virtual desktop, interacts with the proxy server through the connection to complete configuring the FTP server in the virtual desktop, and then start the FTP client.

In this step, the establishing, by the proxy client, the connection with the proxy server in the virtual desktop may include: initiating an IP address query to the virtualization management control center 30 with the identity of the virtual desktop as a keyword, and establishing the connection with the proxy server in the virtual desktop according to the queried IP address. In this embodiment, the virtualization management control center 30 may be modified to add the above-mentioned query interface.

In this step, after establishing the connection with the proxy server in the virtual desktop, the proxy client may also send user login information used when the user logs in the FTP server to the proxy server through the connection, wherein the user login information used when the user logs in the FTP server may be the same as or different from the user login information used when the user logs in the virtual desktop.

In this step, the interacting, by the proxy client, with the proxy server through the connection may include:

determining, by the proxy client, a used configuration parameter of the FTP server according to a user instruction or a default setting, and sending the configuration parameter to the proxy server; or querying, by the proxy client, a configuration parameter of the FTP server specified by the user from the virtualization management control center with the user login information used when the user logs in the virtual desktop as a keyword, and sending the queried configuration parameter of the FTP server to the proxy server.

The FTP server can be automatically configured through any of the above manners. When the latter manner is adopted, personalized configurations in which different configuration parameters are adopted for different users may also be realized.

In step 130, the FTP client, after being started, establishes a data sharing channel with the FTP server to complete an operation of data sharing migration.

In this step, the establishing, by the FTP client, the data sharing channel with the FTP server may include: splicing, by the FTP client, FTP start-up parameters, and establishing the data sharing channel with the FTP server according to the FTP start-up parameters, wherein the FTP start-up parameters include an IP address of the virtual desktop, and a username and a password in the user login information used when the user logs in the FTP server. By using the FTP start-up parameters, the FTP client may log in the FTP server to complete data transmission, and support functions including continuous transmission on the breakpoint, interface modification, transmission mode setting, transmission speed adjusting, transmission process terminating, etc.

The foregoing embodiment may have various modifications. For instance, in another embodiment, the SPICE client queries the IP address of the virtual desktop from the SPICE driver. In this way, the SPICE client, after completing the operation of logging in the virtual desktop by the user in step 110, also initiates a query for the IP address of the virtual desktop to the SPICE driver with the identity of the virtual desktop as the keyword and receive the queried IP address; meanwhile, the SPICE client also transfers the IP address to the proxy client when starting the proxy client; and in step 120, the proxy client may establish a connection with the proxy server in the virtual desktop according to the IP address.

The embodiment of the present disclosure also provides a computer storage medium, wherein the computer storage medium stores a computer-executable instruction for performing the above described method.

The embodiment also provides a virtual desktop client, which is as shown in FIG. 1, including a proxy client 101, an FTP client 102 and an SPICE client 103.

The SPICE client 103 is configured to, after completing an operation of logging in a virtual desktop by a user, start the proxy client according to a user instruction of data sharing migration.

The proxy client 102 is configured to, after being started, establish a connection with the proxy server in the virtual desktop, interact with the proxy server through the connection to complete configuring the FTP server in the virtual desktop, and then start the FTP client.

The FTP client 101 is configured to, after being started, establish a data sharing channel with the FTP server to complete an operation of data sharing migration.

Optionally, the SPICE client is configured to realize the start of the proxy client through a manner of transferring an identity of the virtual desktop to the proxy client; and the proxy client 102 is configured to realize the establishment of the connection with the proxy server in the virtual desktop through a following manner: initiating a query for an IP address to a virtualization management control center with the identity of the virtual desktop as a keyword, and establishing the connection with the proxy server in the virtual desktop according to the queried IP address.

Optionally, the SPICE client 103 is also configured to, after completing the operation of logging in the virtual desktop by the user, initiate a query for an IP address of the virtual desktop to an SPICE driver with the identity of the virtual desktop as the keyword and receive the queried IP address; and the SPICE client 103 is also configured to transfer the IP address to the proxy client when starting the proxy client;

the proxy client 102 is configured to realize the establishment of the connection with the proxy server in the virtual desktop through a manner of establishing, by the proxy client, the connection with the proxy server in the virtual desktop according to the IP address.

Optionally, the SPICE client 103 is also configured to, after completing the operation of logging in the virtual desktop by the user, establish a channel with an SPICE driver in the virtual desktop, and send user login information used when the user logs in the virtual desktop to the SPICE driver through the channel.

Optionally, the proxy client 102 is also configured to, after establishing the connection with the proxy server in the virtual desktop, send the user login information used when the user logs in the FTP server to the proxy server through the connection, wherein the user login information used when the user logs in the FTP server is the same as or different from the user login information used when the user logs in the virtual desktop.

Optionally, the FTP client 101 is configured to realize the establishment of the data sharing channel with the FTP server through a following manner: splicing FTP start-up parameters and establishing the data sharing channel with the FTP server according to the FTP start-up parameters, by the FTP client, wherein the FTP start-up parameters include an IP address of the virtual desktop, and a username and a password in the user login information used when the user logs in the FTP server.

Optionally, the proxy client 102 is configured to realize the interaction with the proxy server through the connection via a following manner:

determining a configuration parameter of the FTP server to be used according to a user instruction or a default setting and sending the configuration parameter to the proxy server, by the proxy client; or querying a configuration parameter of the FTP server specified by the user from a virtualization management control center with the user login information used when the user logs in the virtual desktop as a keyword, and sending the queried configuration parameter of the FTP server to the proxy server, by the proxy client.

Figure 5:
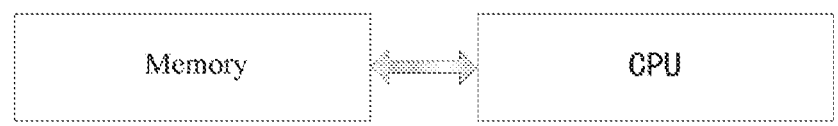
FIG. 5 is a component module diagram of a calculating device according to the embodiment.

As shown in FIG. 5, the embodiment also provides a calculating device, including a memory and a CPU.

The memory is configured to save virtual desktop client software, and the virtual desktop client software includes proxy client software, FTP client software and SPICE client software.

The CPU is configured to execute the software in the memory so as to complete a corresponding processing, including:

executing the SPICE client software to start the proxy client software according to a user instruction of data sharing migration after completing an operation of logging in a virtual desktop by a user;

executing the proxy client software to establish a connection with the proxy server in the virtual desktop, interact with the proxy server through the connection to complete configuring the FTP server in the virtual desktop, and then start the FTP client software; and executing the FTP client software to establish a data sharing channel with the FTP server to complete an operation of data sharing migration.

Second Embodiment

This embodiment provides a method for realizing data sharing between a client and a virtual desktop, which is applied to a virtual desktop system 20 including a proxy server 201, an FTP server 202 and an SPICE driver 203, as shown in FIG. 1. FIG. 1 also illustrates that the virtual desktop system 20 is connected to a virtual desktop client 10 through an SPICE server, and may access a virtualization management control center 30. Two modules including the proxy server 201 and the FTP server 202 are additionally disposed inside the virtual desktop system, and the SPICE driver 203 is modified. A user does not need to additionally install and deploy the proxy server 201 and the FTP server 202. The proxy server 201 is configured to interact service messages with the proxy client running in the virtual desktop client; the FTP server 202 is configured to conduct data transmission with a FTP client running in the virtual desktop client; and the modified SPICE driver is configured to control message processing.

Figure 3:
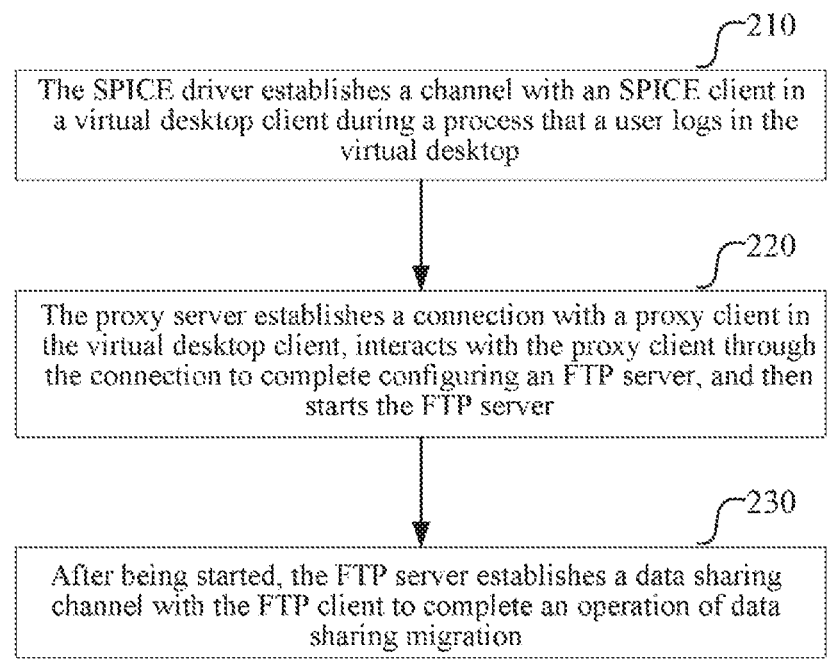
FIG. 3 is a flow chart of a method for data sharing applied to a virtual desktop system side according to the second embodiment of the present disclosure.

As shown in FIG. 3, the method according to this embodiment includes the following steps.

In step 210, the SPICE driver establishes a channel with an SPICE client in a virtual desktop client in a process that a user logs in the virtual desktop.

In this embodiment, after the SPICE driver establishes the channel with the SPICE client in the virtual desktop client, the method further includes: receiving user login information used when the user logs in the virtual desktop which is sent by the SPICE client, and transmitting the user login information to the proxy server.

In step 220, the proxy server establishes a connection with a proxy client in the virtual desktop client, interacts with the proxy client through the connection to complete configuring the FTP server, and then starts the FTP server.

In this step, after the proxy server establishes the connection with the proxy server in the virtual desktop, the method may further include:

receiving user login information used when the user logs in the virtual desktop sent by the proxy client, and comparing the user login information with the user login information previously received by the SPICE driver;

if the two user login information are the same, determining that the authentication on the user is passed, and continuously configuring the FTP server; and if the two user login information are different, determining that the authentication on the user is failed, ending the operation of data sharing migration, and notifying the proxy client.

In this step, the interacting, by the proxy server, with the proxy client through the connection to complete configuring the FTP server may include:

receiving, by the proxy server, a configuration parameter of the FTP server sent by the proxy client and proofreading the configuration parameter;

if the proofreading is passed, using the received configuration parameter of the FTP server to configure the FTP server and notifying a configuration result to the proxy client; and if the proofreading is not passed, notifying the proxy client that the configuration is failed, or using a default configuration parameter of the FTP server to configure the FTP server and notifying a configuration result to the proxy client.

Regarding the configuration parameter of the FTP server, specific provisions are given in corresponding standards, and the FTP server may proofread according to the provisions in the standards, which is not elaborated herein.

In this step, the configuring, by the proxy server, the FTP server further includes: configuring, by the proxy server, the FTP server according to the user login information used when the user logs in the virtual desktop, wherein the user login information used when the user logs in the virtual desktop is namely the user login information used when the user logs in the FTP server.

Alternatively, in this step, the interacting, by the proxy server, with the proxy client through the connection to complete configuring the FTP server further includes:

receiving the user login information used when the user logs in the FTP server which is sent by the proxy client and configuring the FTP server according to the user login information used when the user logs in the FTP server, by the proxy server, wherein the user login information used when the user logs in the FTP server is the same as or different from the user login information used when the user logs in the virtual desktop.

In step 230, the FTP server, after being started, establishes a data sharing channel with the FTP client to complete an operation of data sharing migration.

The embodiment of the present disclosure also provides a computer storage medium, wherein the computer storage medium stores a computer-executable instruction for performing the above described method.

Accordingly, the embodiment also provides a virtual desktop system including a proxy server 201, an FTP server 202 and an SPICE driver 203.

The SPICE driver 203 is configured to establish a channel with an SPICE client in a virtual desktop client in a process that a user logs in the virtual desktop.

The proxy server 201 is configured to establish a connection with a proxy client in the virtual desktop client, interact with the proxy client through the connection to complete configuring the FTP server, and then start the FTP server.

The FTP server 202 is configured to, after being started, establish a data sharing channel with the FTP client to complete an operation of data sharing migration.

Optionally, the SPICE driver 203 is also configured to, after establishing the channel with the SPICE client in the virtual desktop client, receive user login information used when the user logs in the virtual desktop which is sent by the SPICE client, and transmit the user login information to the proxy server.

Optionally, the proxy server 201 is also configured to, after establishing the connection with the proxy client in the virtual desktop client, receive user login information used when the user logs in the virtual desktop sent by the proxy client, and compare the user login information with the user login information previously received by the SPICE driver;

if the two user login information are the same, determine that the authentication on the user is passed, and continuously configure the FTP server; and if the two user login information are different, determine that the authentication on the user is failed, end the operation of data sharing migration, and notify the proxy client.

Optionally, the proxy server 201 is configured to achieve the interaction with the proxy client through the connection to complete configuring the FTP server through a following manner:

receiving a configuration parameter of the FTP server sent by the proxy client and proofreading the configuration parameter, by the proxy server;

if the proofreading is passed, using the received configuration parameter of the FTP server to configure the FTP server and notifying a configuration result to the proxy client; and if the proofreading is not passed, notifying the proxy client that the configuration is failed, or using a default configuration parameter of the FTP server to configure the FTP server and notifying a configuration result to the proxy client.

Optionally, the proxy server 201 is further configured to achieve the configuration of the FTP server through a following manner: configuring, by the proxy server, the FTP server according to the user login information used when the user logs in the virtual desktop, wherein the user login information used when the user logs in the virtual desktop is namely the user login information when the user logs in the FTP server.

Optionally, the proxy server 201 is also configured to achieve the interaction with the proxy client through the connection to complete configuring the FTP server through a following manner: receiving the user login information when the user logs in the FTP server sent by the proxy client and configuring the FTP server according to the user login information used when the user logs in the FTP server, wherein the user login information used when the user logs in the FTP server is the same as or different from the user login information used when the user logs in the virtual desktop.

Accordingly, the embodiment also provides a calculating device including a memory and a CPU. The structure of the calculating device may be referred to FIG. 5.

The memory is configured to save virtual desktop system software, and the virtual desktop system software includes proxy server software, FTP server software and SPICE driver software.

The CPU is configured to execute the software in the memory so as to complete a corresponding processing, including:

executing the SPICE driver software to establish a channel with an SPICE client in a virtual desktop client in a process that a user logs in the virtual desktop;

executing the proxy server software to establish a connection with the proxy client in the virtual desktop client, interact with the proxy client through the connection to complete configuring the FTP server, and then start the FTP server software; and executing the FTP server software to establish a data sharing channel with the FTP client to complete an operation of data sharing migration.

Hereinafter, illustrations will be given by using several examples in application.

First Example

Figure 4:
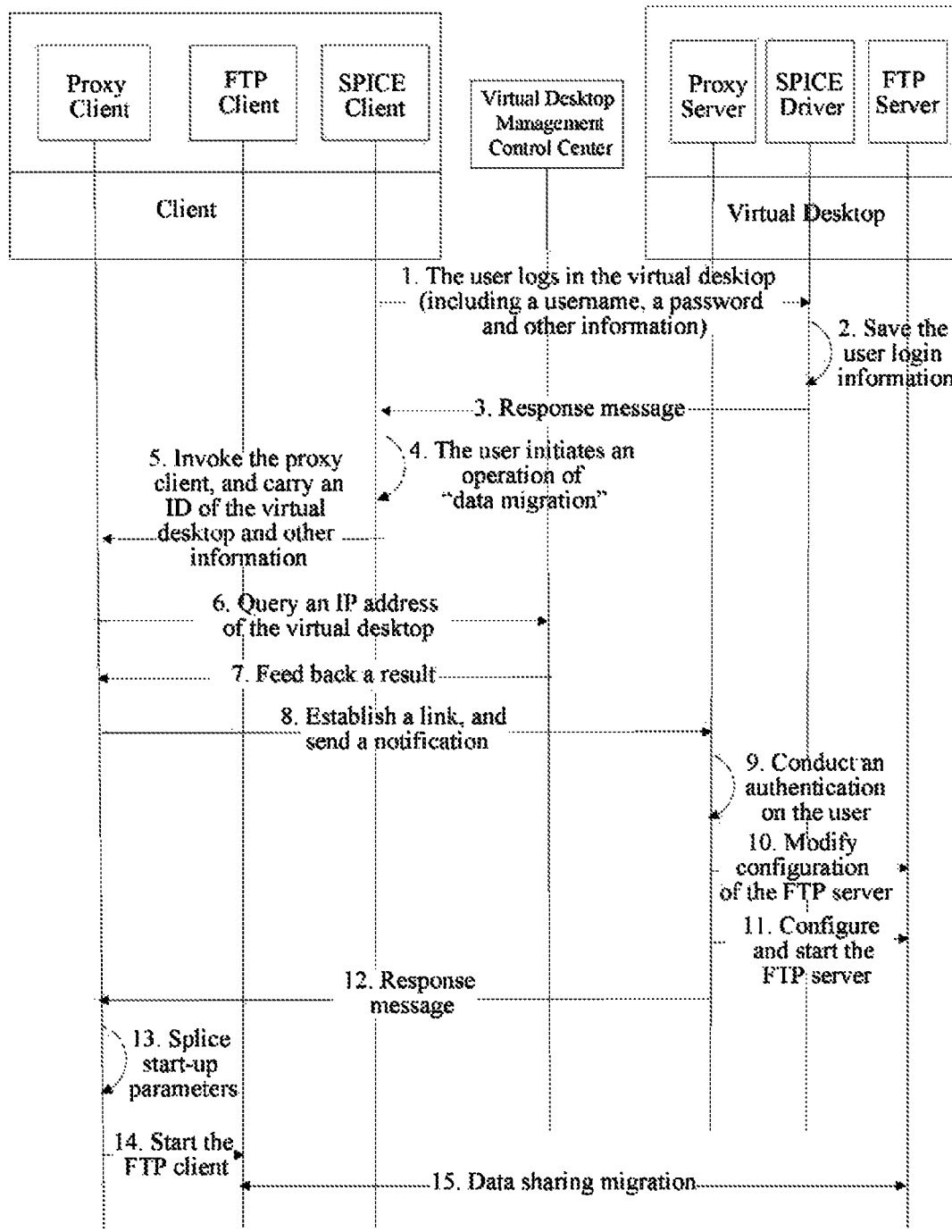
FIG. 4 is a schematic diagram of a data sharing business flow between a client and a virtual desktop according to a first example of the present disclosure.

This example is a business flow of data sharing between a client and a virtual desktop, which is as shown in FIG. 4, including the followings.

1. A user logs in the virtual desktop through an SPICE client on the basis of an SPICE frame, establishes a channel with an Spice driver, and sends login information used when the user logs in the virtual desktop to the Spice driver, for example, the login information includes a user name and a password.

2. The Spice driver saves the user login information, and the user login information may be transmitted to a proxy server for authentication of the user.

3. The Spice driver feeds back a response message to the SPICE Client; and if the result is abnormal, the SPICE Client may prohibit the user from initiating an operation of data sharing.

4. The user of the virtual desktop initiates an operation of data sharing migration through the SPICE client.

5. The SPICE Client starts the proxy client and transfers an ID of the virtual desktop and other information, additionally, the user login information used when the user logs in the virtual desktop may also be transferred to the proxy client.

6. A proxy client module initiates a request for querying an IP address of the virtual desktop to a virtualization management control center with the ID of the virtual desktop as a keyword.

7. The virtualization management control center returns a query result to the proxy client; it is supposed that the query result is YES, but if the query result is NO, a data sharing flow may be terminated.

8. The proxy client establishes a link with the proxy server, and transmits a request message for data sharing. The request message carries the user login information used when the user logs in the virtual desktop (which is also served as an authentication parameter and user login information when the user logs in the FTP server, which may either be transferred by the SPICE Client, or be saved/configured in the proxy client) and a configuration parameter of the FTP server, etc. The configuration parameter of the FTP server herein may be inputted by the user or default; in another example, the proxy client may also query a configuration parameter of the FTP server specified by the user from the virtualization management control center.

9. The proxy server checks the configuration parameter of the FTP server, and conducts an authentication operation. Here, the proxy server may acquire the user login information saved by the SPICE driver from the SPICE driver, and compare the user login information with the user login information sent by the proxy client. For example, the usernames and passwords are compared; if they are consistent, then the authentication is passed; and if they are not consistent, then the authentication is not passed. The flow here is that it is supposed the authentication is passed; and if the authentication is not passed, the proxy server may notify the proxy client that the authentication is failed, and end the flow.

10. The proxy server modifies the configuration parameter of the FTP server. This step is optional; and if the configuration parameter conforms to the provisions, then the configuration parameter does not need to be modified.

11. The proxy server configures the FTP server, and after completing the configuration, starts an FTP server module; excluding using the configuration parameter, the configuration of the FTP server further includes a configuration operation of using user login information used when the user logs in the FTP server, for example, using the username in the user login information to create a file directory for the user.

12. The proxy server sends a response message to the proxy client module to feed back a configuration result. If the configuration is abnormal, the proxy client may terminate the data sharing business flow and notify the user.

13. The proxy client splices start-up parameters of an FTP client module, for example, a form of the IP address and the username and password in the user login information (i.e., the user login information used when the user logs in the virtual desktop in this example) used when the user logs in the FTP server may be used.

14. The proxy client module starts the FTP client according to the start-up parameters.

15. The FTP client and the FTP server establish a data sharing channel between the client and the virtual desktop, and the user may complete a one-way or two-way operation of data sharing migration through a simple graphical interface.

Second Example

In the first example, the authentication of the user is completed by saving the user login information used when the user logs in the virtual desktop and reporting the user login information again when the user conducts the operation of data migration. Meanwhile, the user login information used when the user logs in the virtual desktop is used as the user login information used when the user logs in the FTP server to complete the configuration of the FTP server.

In this example, the authentication of the user is no longer conducted, but the user login information used when the user logs in the virtual desktop is still used as the user login information used when the user logs in the FTP server. The following only describes the difference between this example and the first example.

In the first step, the user logs in the virtual desktop through the SPICE client on the basis of the SPICE frame, establishes the channel with the Spice driver, but does not send the login information used when the user logs in the virtual desktop to the Spice driver.

The second step and the third step may be omitted.

In the eighth step, the proxy client establishes a link with the proxy server, and sends the request message for data sharing, wherein the request message carries the user login information used when the user logs in the virtual desktop, which is used as the user login information when the user logs in the FTP server, but is not used as an authentication parameter.

In the ninth step, the proxy server checks the configuration parameter of the FTP server, but does not conduct an authentication operation.

Compared with the first example, this example saves the procedure of authenticating the user information, and is relatively more convenient to carry out (saving the modification of the Spice driver and partial modification of the Spice Client), but is relatively weaker in the security aspect of user data.

Third Example

The user login information used when the user logs in the virtual desktop in this example is different from the user login information used when the user logs in the FTP server, and authentication of the user is conducted.

This example differs from the first example in the following aspect.

In the eighth step, the proxy client establishes a link with the proxy server, and sends a request message for data sharing, wherein the request message carries the user login information used when the user logs in the virtual desktop, the user login information used when the user logs in the FTP server, the configuration parameter of the FTP server, or the like. The user login information used when the user logs in the FTP server here may be inputted by the user or may be read locally.

Fourth Example

The user login information used when the user logs in the virtual desktop in the example is different from the user login information used when the user logs in the FTP server, and no authentication is conducted on the user.

This example differs from the first example in the following aspects:

In the first step, the user logs in the virtual desktop through the SPICE client on the basis of the SPICE frame, establishes the channel with the Spice driver, but does not send the login information used when the user logs in the virtual desktop to the Spice driver.

The second step and the third step may be omitted.

In the fifth step, the SPICE Client starts the proxy client and transfers the ID of the virtual desktop and other information, wherein the user login information used when the user logs in the virtual desktop does not need to be transferred to the proxy client.

In the eighth step, the proxy client establishes a link with the proxy server, and sends a request message for data sharing, wherein the request message carries the user login information used when the user logs in the FTP server, the configuration parameter of the FTP server, or the like. The user login information used when the user logs in the FTP server here may be inputted by the user or may be read locally.

In the ninth step, the proxy server checks the configuration parameter of the FTP server, but does not conduct an authentication operation.

In the second example and the fourth example mentioned above, although the proxy server does not perform the authentication, the user identify verification may be achieved through the authentication function of the FTP server in the fifteenth step. In the first example and the fifth example, the user identify may be verified again through the authentication function of the FTP server.

Fifth Example

According to the first example, the Spice Client queries from the virtualization management control center to acquire the IP address of the virtual desktop, which is different from the present example. In the present example, by spreading (extending) the event and processing between the Spice Client and the Spice driver, this query interface is altered to be disposed between the Spice Client and the Spice driver.

This example differs from the first example in the following aspects.

In the fifth step, the Spice Client directly sends an IP address request message to the Spice driver.

In the sixth step, the Spice driver returns a request result to the Spice Client.

In the seventh step, the Spice Client starts the proxy client module and transfers the ID of the virtual desktop and other information, additionally, the user login information used when the user logs in the virtual desktop may be transferred to the proxy client.

According to the solutions of the foregoing embodiments and examples, the data sharing and migration function between the client and the virtual desktop can be effectively accomplished through modifying the SPICE driver and the SPICE client, under the control of the virtualization management control center and utilizing the newly-added proxy modules (proxy client and proxy server) and FTP processing modules (FTP client and FTP server), the user does not need to additionally configure the FTP server and use the FTP processing module, the operation of data sharing becomes simple and clear, which can improve the user experience on the aspect of data sharing quickly, can be deployed conveniently and quickly, have good economic benefits, and also reduce the requirements on the IT skills of the user and improve the successful rate of sharing. In addition, the security of user data can be sufficiently guaranteed through an authentication operation. The present disclosure has a fully-featured highlight function, and has an excellent demonstration significance on promoting the virtual desktop on the basis of a VDI infrastructure and the SPICE transfer protocol.

It is to be understood by those skilled in the art that all or part of the steps mentioned above may be completed by related hardware instructed by a program which may be stored in a computer readable storage medium, such as a read-only memory, a magnetic disk or an optical disc. Optionally, all or a part of steps of the foregoing embodiments may also be implemented by one or more integrated circuits. Accordingly, individual modules/units in the foregoing embodiments may be implemented in the form of hardware or software functional modules. The invention is not limited to a combination of hardware and software in any particular form.

The above-described contents are merely preferred embodiments of the present disclosure, but are not intended to limit the disclosure. For those skilled in the art, various alterations and variations may be made to the present disclosure. Any modifications, equivalent substitutions and improvements made within the principle of the present disclosure shall all fall within the protection scope of the present disclosure.

INDUSTRIAL APPLICABILITY

The above solutions realize the data sharing between the client and the virtual desktop, are simple and easy for use, and can also ensure the data security of the users through authentication.

What is claimed is:

1. A method for realizing data sharing between a client and a virtual desktop, applied to a virtual desktop client comprising a simple protocol for independent computing environment SPICE client, a proxy client and a file transfer protocol FTP client, wherein the method comprises:
   after completing an operation of logging in the virtual desktop by a user via the SPICE client, starting, by the SPICE client, the proxy client according to a user instruction of data sharing migration;
   after the proxy client is started, establishing, by the proxy client, a connection with a proxy server in the virtual desktop, the proxy client interacting with the proxy server through the connection to complete configuring a FTP server in the virtual desktop, and then starting the FTP client; and
   after the FTP client is started, establishing, by the FTP client, a data sharing channel with the FTP server to complete an operation of data sharing migration.

2. The method according to claim 1, wherein
the starting, by the SPICE client, the proxy client comprises: transferring an identity of the virtual desktop to the proxy client; and
the establishing, by the proxy client, the connection with the proxy server in the virtual desktop comprises: initiating a query for a network protocol IP address to a virtualization management control center by using the identity of the virtual desktop as a keyword, and establishing the connection with the proxy server in the virtual desktop according to the queried IP address.

3. The method according to claim 1, further comprising:
after completing the operation of logging in the virtual desktop by the user via the SPICE client, initiating a query for a network protocol IP address of the virtual desktop to an SPICE driver by using an identity of the virtual desktop as a keyword and receiving the queried IP address, by the SPICE client; and
when starting the proxy client by the SPICE client, further transferring, by the SPICE client, the IP address to the proxy client,
wherein the establishing, by the proxy client, the connection with the proxy server in the virtual desktop comprises: establishing, by the proxy client, the connection with the proxy server in the virtual desktop according to the IP address.

4. The method according to claim 1, further comprising:
after completing the operation of logging in the virtual desktop by the user via the SPICE client, establishing a channel with an SPICE driver in the virtual desktop and sending user login information used when the user logs in the virtual desktop to the SPICE driver through the channel, by the SPICE client.

5. The method according to claim 1, further comprising:
after the proxy client establishes the connection with the proxy server in the virtual desktop, sending, by the proxy client, user login information used when the user logs in the FTP server through the connection, wherein the user login information used when the user logs in the FTP server is the same as or different from user login information used when the user logs in the virtual desktop.

6. The method according to claim 1, wherein
the establishing, by the FTP client, the data sharing channel with the FTP server comprises:
splicing FTP start-up parameters and establishing the data sharing channel with the FTP server according to the FTP start-up parameters, by the FTP client, wherein the FTP start-up parameters comprise an IP address of the virtual desktop, and a username and a password in user login information used when the user logs in the FTP server.

7. The method according to claim 1, wherein
the interacting, by the proxy client, with the proxy server through the connection comprises:
determining a configuration parameter of the FTP server to be used according to a user instruction or a default setting and sending the configuration parameter to the proxy server, by the proxy client; or
querying a configuration parameter of the FTP server specified by the user from the virtualization management control center by using user login information used when the user logs in the virtual desktop as a keyword and sending the queried configuration parameter of the FTP server to the proxy server, by the proxy client.

8. A method for realizing data sharing between a client and a virtual desktop, applied to a virtual desktop system comprising a simple protocol for independent computing environment SPICE driver, a proxy server and a file transfer protocol FTP server, wherein the method comprises:
establishing, by the SPICE driver, a channel with an SPICE client in a virtual desktop client during a process that a user logs in the virtual desktop;
establishing, by the proxy server, a connection with a proxy client in the virtual desktop client, interacting with the proxy client through the connection to complete configuring the FTP server, and then starting the FTP server; and
after the FTP server is started, establishing, by the FTP server, a data sharing channel with the FTP client to complete an operation of data sharing migration.

9. The method according to claim 8, further comprising:
after the SPICE driver establishes the channel with the SPICE client in the virtual desktop client, receiving, by the SPICE driver, user login information used when the user logs in the virtual desktop sent by the SPICE client, and transmitting the user login information to the proxy server.

10. The method according to claim 9, further comprising:
after the proxy server establishes the connection with the proxy client in the virtual desktop client, receiving user login information used when the user logs in the virtual desktop sent by the proxy client and comparing the user login information with the user login information previously received by the SPICE driver, by the proxy server;
if the two user login information are the same, determining that an authentication on the user is passed, and continuously configuring the FTP server; and
if the two user login information are different, determining that the authentication on the user is failed, ending the operation of data sharing migration, and notifying the proxy client.

11. The method according to claim 8, wherein
the interacting, by the proxy server, with the proxy client through the connection to complete configuring the FTP server comprises:
receiving a configuration parameter of the FTP server sent by the proxy client and proofreading the configuration parameter, by the proxy server;
if the proofreading is passed, using the received configuration parameter of the FTP server to configure the FTP server and notifying a configuration result to the proxy client; and
if the proofreading is not passed, notifying the proxy client that the configuration is failed, or using a default configuration parameter of the FTP server to configure the FTP server and notifying a configuration result to the proxy client.

12. The method according to claim 11, wherein the configuring, by the proxy server, the FTP server further comprises:
configuring, by the proxy server, the FTP server by using user login information used when the user logs in the virtual desktop as user login information used when the user logs in the FTP server.

13. The method according to claim 11, wherein
the interacting, by the proxy server, with the proxy client through the connection to complete configuring the FTP server further comprises:
receiving user login information used when the user logs in the FTP server sent by the proxy client and configuring the FTP server according to the user login information used when the user logs in the FTP server, by the proxy server, wherein the user login information used when the user logs in the FTP server is the same as or different from user login information used when the user logs in the virtual desktop.

14. A device for realizing data sharing between a virtual desktop client and a virtual desktop, wherein the virtual desktop client comprises a simple protocol for independent computing environment SPICE client, a proxy client and a file transfer protocol FTP client, the device comprising a processor and a memory storing a processor executable instruction, wherein the processor, when executing the instruction, performs the following actions:
after completing an operation of logging in the virtual desktop via the SPICE client, starting, by the SPICE client, the proxy client according to a user instruction of data sharing migration;
after the proxy client is started, establishing, by the proxy client, a connection with a proxy server in the virtual desktop, the proxy client interacting with the proxy server through the connection to complete configuring a FTP server in the virtual desktop, and then starting the FTP client; and
after the FTP client is started, establishing, by the FTP client, a data sharing channel with the FTP server to complete an operation of data sharing migration.

15. The device according to claim 14, wherein
the starting, by the SPICE client, the proxy client comprises: transferring an identity of the virtual desktop to the proxy client; and
the establishing, by the proxy client, the connection with the proxy server in the virtual desktop comprises: initiating a query for a network protocol IP address of the virtual desktop to a virtualization management control center by using the identity of the virtual desktop as a keyword, and establishing the connection with the proxy server in the virtual desktop according to the queried IP address.

16. The device according to claim 14, wherein
the processor, when executing the instruction, performs:
after completing the operation of logging in the virtual desktop via the SPICE client, initiating a query for an IP address of the virtual desktop to an SPICE driver by using an identity of the virtual desktop as a keyword and receiving the queried IP address, by the SPICE client; and
when starting the proxy client by the SPICE client, further transferring, by the SPICE client, the IP address to the proxy client,
wherein the establishing, by the proxy client, the connection with the proxy server in the virtual desktop comprises: establishing, by the proxy client, the connection with the proxy server in the virtual desktop according to the IP address.

17. The device according to claim 14, wherein
the processor, when executing the instruction, performs:
after completing the operation of logging in the virtual desktop via the SPICE client, establishing a channel with an SPICE driver in the virtual desktop and sending user login information used when the user logs in the virtual desktop to the SPICE driver through the channel, by the SPICE client.

18. The device according to claim 14, wherein
the processor, when executing the instruction, performs:
after the proxy client establishes the connection with the proxy server in the virtual desktop, sending, by the proxy client, user login information used when the user logs in the FTP server to the proxy server through the connection, wherein the user login information used when the user logs in the FTP server is the same as or different from user login information used when the user logs in the virtual desktop.

19. The device according to claim 14, wherein
the establishing, by the FTP client, the data sharing channel with the FTP server comprises:
splicing FTP start-up parameters and establishing the data sharing channel with the FTP server according to the FTP start-up parameters, by the FTP client, wherein the FTP start-up parameters comprise an IP address of the virtual desktop, and a username and a password in user login information used when the user logs in the FTP server.

20. The device according to claim 14, wherein
the interacting, by the proxy client, with the proxy server through the connection comprises:
determining a configuration parameter of the FTP server to be used according to a user instruction or a default setting and sending the configuration parameter to the proxy server, by the proxy client; or
querying a configuration parameter of the FTP server specified by the user from the virtualization management control center by using user login information used when the user logs in the virtual desktop as a keyword and sending the queried configuration parameter of the FTP server to the proxy server, by the proxy client.

* * * * *